(12) United States Patent
Semmes, Jr. et al.

(10) Patent No.: US 7,391,874 B1
(45) Date of Patent: Jun. 24, 2008

(54) AUDIO CONSOLE WITH INTEGRAL VIDEO MONITOR

(75) Inventors: Alphonso Thomas Semmes, Jr., Nashville, TN (US); David B. Ives, Chapel Hill, TN (US)

(73) Assignee: GLW Incorporated, LaVergne, TN (US)

( * ) Notice: Subject to any disclaimer, the term of this patent is extended or adjusted under 35 U.S.C. 154(b) by 673 days.

(21) Appl. No.: 10/624,009

(22) Filed: Jul. 21, 2003

Related U.S. Application Data

(60) Provisional application No. 60/397,431, filed on Jul. 19, 2002.

(51) Int. Cl.
*H04B 1/00* (2006.01)
*H04N 5/22* (2006.01)
*H04N 9/74* (2006.01)
*G06F 17/00* (2006.01)
*G06F 3/00* (2006.01)
*G06F 3/48* (2006.01)

(52) U.S. Cl. ............. 381/119; 348/333.01; 348/333.02; 348/333.05; 348/333.11; 348/588; 700/94; 715/716; 715/763; 715/771

(58) Field of Classification Search ................. 381/119; 348/333.01, 333.02, 333.05, 588, 589; 700/94; 715/716, 771, 763
See application file for complete search history.

(56) References Cited

U.S. PATENT DOCUMENTS

| | | | |
|---|---|---|---|
| 3,538,254 A | 11/1970 | Ancha | |
| 3,889,051 A | 6/1975 | Legler | |
| 4,187,395 A | 2/1980 | Hewson, Jr. | |
| D291,196 S | 8/1987 | Ito et al. | |
| 4,879,751 A | 11/1989 | Franks et al. | |
| 5,181,114 A * | 1/1993 | Richards et al. | 725/32 |
| 5,477,337 A | 12/1995 | Schuler | |
| 5,479,519 A * | 12/1995 | Davis | 381/119 |
| 5,608,807 A * | 3/1997 | Brunelle | 381/119 |
| 5,694,861 A | 12/1997 | Laukamm-Josten | |
| 5,822,015 A | 10/1998 | Barton et al. | |
| 5,906,035 A | 5/1999 | Atkins | |
| 6,042,203 A | 3/2000 | Bogucki | |
| 6,170,406 B1 | 1/2001 | Klein et al. | |
| 6,266,100 B1 | 7/2001 | Gloudemans et al. | |
| 6,353,461 B1 | 3/2002 | Shore et al. | |
| 6,438,753 B1 | 8/2002 | Fegesch et al. | |
| 6,728,382 B1 * | 4/2004 | Silfvast | 381/119 |
| 7,006,154 B2 * | 2/2006 | Dudkowski | 348/588 |
| 2002/0126226 A1 | 9/2002 | Dudkowski | |
| 2002/0196329 A1 | 12/2002 | Dudkowski | |

FOREIGN PATENT DOCUMENTS

GB 2323699 A 9/1998

* cited by examiner

*Primary Examiner*—Vivian Chin
*Assistant Examiner*—Devona E. Faulk
(74) *Attorney, Agent, or Firm*—Stites & Harbison, PLLC; Jeffrey A. Haeberlin; David W. Nagle, Jr.

(57) ABSTRACT

An audio mixing console that comprises at least one input connector for receiving a video signal for broadcast; at least one input connector for receiving an audio signal; a control panel that includes a plurality of user operable audio channel controls; a signal processing unit for generating an audio output signal; and at least one display monitor integral to the audio console for displaying a video signal for broadcast.

21 Claims, 3 Drawing Sheets

AUDIO CONSOLE WITH INTEGRAL VIDEO MONITOR

PRIORITY INFORMATION

The present application claims priority of U.S. Application No. 60/397,431, filed Jul. 19, 2002, the contents of which are incorporated herein by reference in their entirety.

FIELD OF THE INVENTION

The present invention relates generally to the field of mixing consoles for audio signals.

The present invention relates to a system for television signal processing. More specifically, The present invention also relates to an audio production console for mixing audio signals that correspond to television images.

BACKGROUND OF THE INVENTION

The present invention relates to audio consoles such as professional audio consoles used by audio, television, and film production crews during live and pre-recorded television broadcasts and video/film recording.

The use of audio consoles is common in television broadcast stations. Audio consoles may also be used with respect to remote trucks, networks, and local television facilities.

These audio consoles generally fall into two categories: (1) those used to create audio for future delivery, and (2) those used for live, on-air productions. In both instances, the audio operators actions are separate from those of the video switcher (i.e., the director). The audio operator typically follows instructions from the director, switching audio "in-time" with certain video switching. Besides relying on the directors instructions, the audio operator additionally takes visual cues from an array of video monitors. These video monitors are collectively referred to as "the monitor wall" and require significant physical space and energy.

In a typical arrangement, the audio control booth is a sound proof, glassed-in room located behind the director's position. The glass window allows the audio operator to see the common monitor wall located in front of the director. The distance between the audio operator and the monitor wall can range from fifteen to twenty-five feet or more.

The monitor wall displays the video sources necessary for the current production. These video sources can include, but are not limited to, a video tape output with accompanying audio, or a video without audio, or direct video feeds from various cameras. Besides displaying video sources, most monitor walls also contain the main program out monitor (i.e., the broadcast signal) and a program preview monitor used to "proof" the next selection. As production progresses, the audio operator must constantly be aware of what the next shot will be and what audio will be required. During a fast-moving production, such as a sporting event, the audio source can change for each camera angle. For example, a road race might have cameras and microphones at each turn and straight away. As a director quickly switches to follow cars around the track, so must the audio switch for each new view. Switching can be seconds apart with little or no opportunity to instruct the audio operator.

Usually, with respect to the production of live television, the live television signal comprises a video signal of an event that is captured by a video camera and accompanying audio signal that is captured, for example, by a microphone. Both signals are transmitted via one or more video and audio media while the event is still occurring (i.e., in real time). The most prevalent technology used for broadcasting a live sporting even on television is a "TV remote truck."

The equipment in the TV truck typically includes a monitor wall with separate monitors displaying the output of each camera. A preview monitor displays the next possible live camera or video source that may be selected for broadcast.

SUMMARY AND OBJECTS OF THE PRESENT INVENTION

Giving that switching broadcast cameras can be seconds apart with little or no opportunity to instruct the audio operator, to date there has been no adequate solution to the audio operator's video monitoring needs. Therefore, it is an object of the present invention to provide for an audio console with integral video monitors for use by the audio operator in production activities. In other embodiments of the present invention, the video monitors are mounted in the meter bridge of an audio console.

Another object of the present invention is to provide an audio mixing console with integral video monitors to allow for an easier, less expensive, more convenient arrangement of the audio control booth. That is, there would be no requirement for the audio control booth to be located in sight of the monitor wall.

One embodiment of the present invention is an audio mixing console that comprises at least one input connector for receiving a video signal for broadcast, at least one input connector for receiving an audio signal, and a control panel. The control panel includes a plurality of user operable audio control panels that can be used to select a predetermined audio processing function for a respective audio channel. This embodiment also includes at least one display monitor integral to the audio console for displaying a video signal for broadcast, and a signal processing unit for generating an audio output signal.

Another embodiment of the present invention is an audio mix controller that has a main frame for housing audio processing equipment, an incoming and outgoing audio signal, and audio processing devices to associate an outgoing audio signal with a video signal, all mounted in the audio main frame. This audio mix controller also has a monitor housing the main frame to display a video signal that corresponds to an outgoing audio signal.

Another embodiment of the present invention is an audio mixing console for mixing sounds associated with video sources. This includes a console-style layout that has a series of controls representing channel modules. It further comprises a meter bridge that includes an indicator corresponding to a channel control function. Finally, this embodiment further comprises at least one display monitor integral to the meter bridge for displaying a video signal for broadcast.

Another embodiment of the present invention is a method of editing a television broadcast. This method comprises providing an audio mix console or audio mix controller of the present invention, reviewing a display monitor that is integral to the audio mix console to determine the video signal selected for broadcast, and selecting an audio channel to be processed by the signal processing unit and generated as an audio output signal. Alternatively, the console may comprise a control switch that allows for automatic selection of an audio output signal based on a particular video signal selected for broadcast.

Another embodiment of the present invention is an audio mixing system. This audio mixing system comprises a main frame for housing audio processing equipment, a video signal, an incoming audio signal, and outgoing audio signal, audio processing devices to associate an outgoing audio signal with a video signal, a console having operable input devices to control the signals that associate an outgoing audio signal with a video signal, and a monitor to display a video signal that corresponds to an outgoing audio signal.

These and other objects will be apparent from the present disclosure and claims. Additional substance, advantages and other novel features of the invention will be set forth in part in the description that follows and in part will become apparent to those skilled in the art upon inspection of the following or may be learned with practice of the invention or improved development. Further, the above embodiments are examples of the present invention and not intended to be limiting thereof.

DETAILED DESCRIPTION OF THE INVENTION

As stated above, the use of audio consoles in video production, such as the production of television broadcasts is common. Furthermore, such productions are complicated and typically require multiple people performing multiple tasks in unison.

Figure 1:
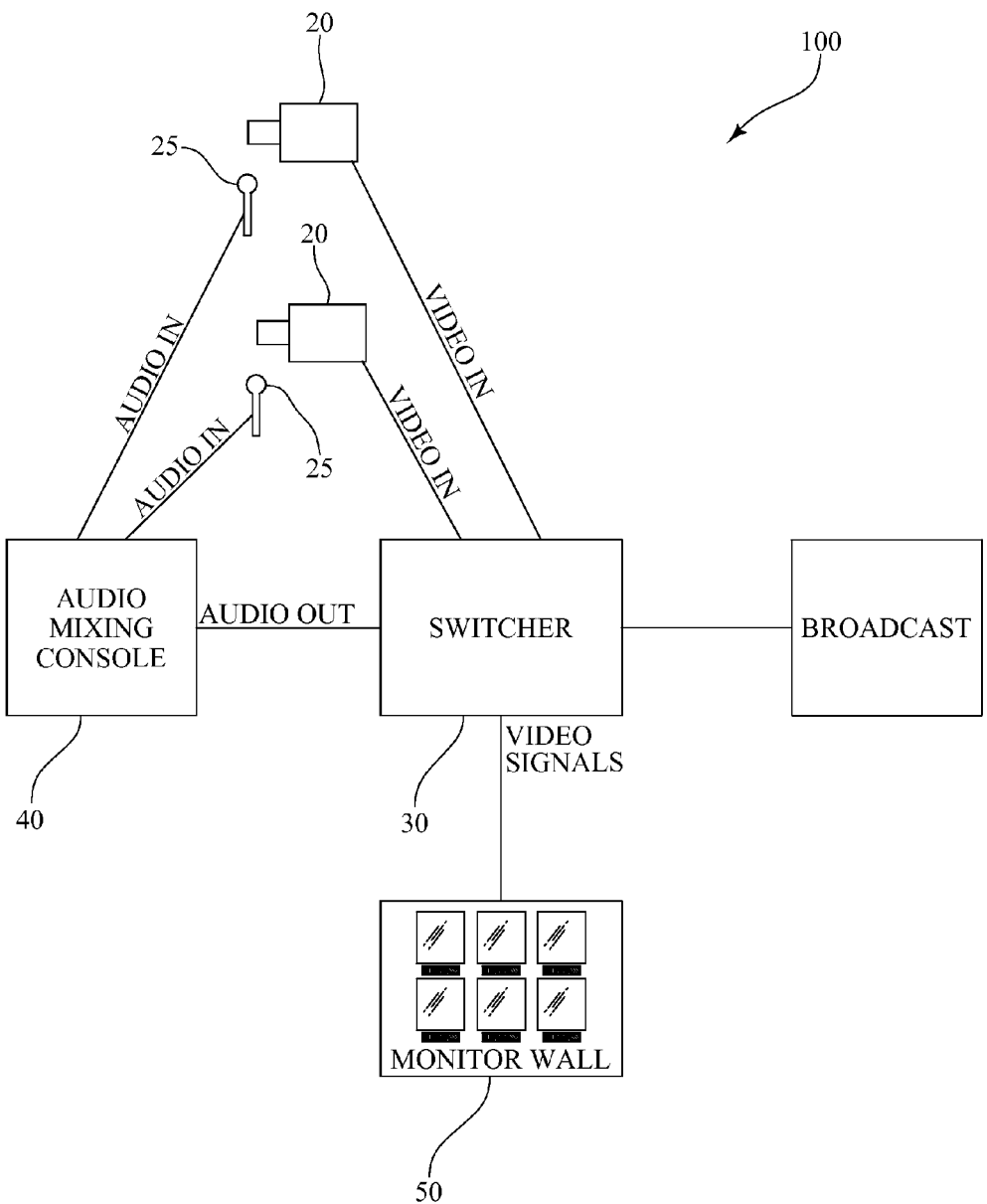
FIG. 1 is a block diagram showing an example of a prior art audio mixing method.

FIG. 1 is a block diagram that illustrates an example of how a prior art production system 100 may work while using a prior art audio console 40. As shown in FIG. 1, this system comprises multiple video sources such as cameras 20 and multiple audio sources such as microphones 25. In this figure each camera 20 generates an input video signal that is streamed into the switcher 30. The microphones 25 generate an input audio signal that is streamed into audio mixing console 40. Typically, each video signal is displayed on a monitor wall 50 which comprises a plurality of monitors. An audio signal is chosen based on the video signal that is broadcast. All this is done in real time. Typically, a director chooses which signal is being broadcast and control such input to the switcher. A second operator is usually in charge of the audio mixing console. Upon consultation of the monitors on the monitor wall 50, the operator on the mixing console 40 controls an audio out signal to correspond with the appropriate video signal being broadcast.

As stated above, the fact that the operator of an audio mixing console has to consult a monitor wall is a disadvantage. In video and television production applications, space is often at a premium and typically only one monitor wall is practical. Accordingly, there are limited options with respect to the position of the audio mixing console because it must be within sight of the monitor wall.

Typical audio mixing consoles are described in U.S. Pat. Nos. 5,608,807 and 4,879,751, both of which are incorporated herein referenced in their entirety.

Figure 2:
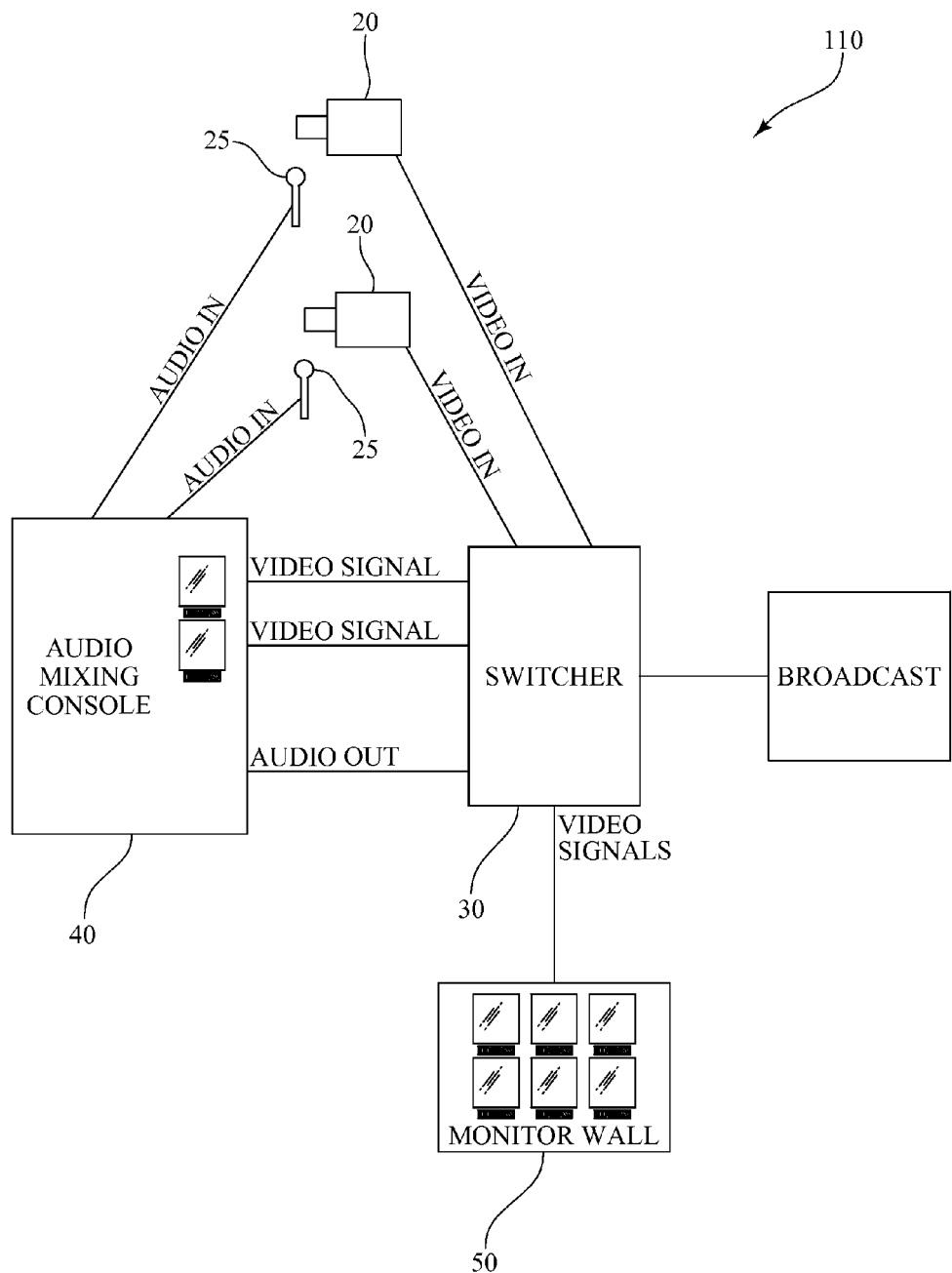
FIG. 2 is a block diagram showing an example of the audio mixing method of the present invention, using a mixing console of the present invention.

FIG. 2 shows an audio mixing system 110 of the present invention. It also comprises a video source typically supplied by television camera 20. The video source feeds into a switcher 30 and the video is displayed on a monitor wall 50. However, this system comprises an audio mixing console 40 of the present invention. The embodiment of the present invention depict in FIG. 2 includes an audio console with integral video monitors. The video monitors allow an operator to monitor the video sources including the video out source that is being currently broadcast or recorded. Thus, in this embodiment, the audio operator is not confined to an area that would require the monitor wall 50 to be in sight.

The advantages of a system of the present invention compared with a system of FIG. 1 are numerous. More specifically, the advantages include: lower estimated cost as compared to the same number of conventionally mounted monitors (i.e., a less expensive alternative than an additional monitor wall), room design freedom (i.e., audio consoles do not have to be positioned to provide a sight line to other monitors, and less room depth is required (which allows for better acoustic layout and design).

Furthermore, operators of the system of the present invention have advantages, which include: less eye fatigue from optional flicker-free LCD monitors, no need to re-focus eyes to distant monitors, optional high resolution displays which offer better detail for visual audio cues.

Figure 3:
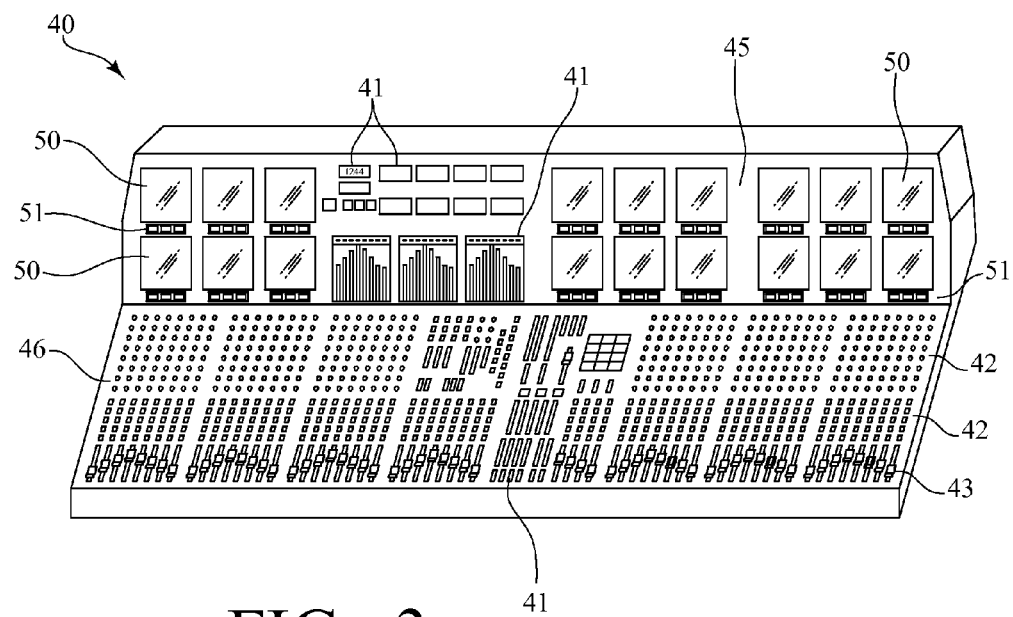
FIG. 3 is a drawing of a mixing console of the present invention.

An example of an audio console for use with the present invention is depicted in FIG. 3. The audio console of this embodiment comprises a control surface 46. The control surface may be any audio mixing console control surface used in the art. As stated above, the use of audio consoles is common in television broadcast. One of ordinary school in the art would understand that the control surface of the present invention is interchangeable with similar control surfaces known in the art. The controlled surface shown in this embodiment comprises displays 41, faders 43, and various auxiliary control knobs 42. In this embodiment the meter bridge 45 comprises a plurality of display monitors 50. Typically the number of monitors 50 fitted onto the console 40 is only limited by the size of the console 40 and the size of the monitors 50. The embodiment depicted in FIG. 3, each monitor 50 has an associated label 51 identifying the status of a selected video source. The meter bridge further comprises various displays 41.

One embodiment of the present invention is an audio mixing console 40 that comprises at least one display monitor 50 integral to the audio console for displaying a video signal for broadcast. The mixing console 40 of this embodiment further comprises at least one input connector for receiving a video signal for broadcast. Typically there would be one input connector for each display monitor 50 that is part of the audio mixing console 40. This embodiment further comprises at least one input connector for receiving an audio signal or audio in. Furthermore, this embodiment, like all standard audio mixing consoles, comprises a control panel 46 that includes a plurality of user operable audio channel controls 42, 43, wherein each of said user operable audio channel controls is operable to select a predetermined audio processing function for a respective audio channel. Typically the audio channel is broadcast in real time with a corresponding video signal. The mixing console of this embodiment further comprises a signal processing unit for generating the audio output signal that is broadcast.

In certain embodiments, the mixing console 40 further comprises a meter bridge 45 that, as is standard, includes at least one indicator that corresponds to a channel control function.

The audio mixing console of this embodiment generates a real time audio signal that corresponds to a real time video signal generated from the television camera.

Typically, with respect to the present invention the display monitor 50 is a liquid crystal display (LCD) monitor. Another embodiment of the present invention for convenience purposes and ease of viewing, the display monitor 50 may be integral to the meter bridge 45.

As stated above, the number of monitors 50 fitted into the console 40 is limited only by the size of the console and the size of the monitors. In most all circumstances, the audio mixing console 40 of the present invention comprises more than one display monitor 50.

The video signal is generated from a video recording with accompanying audio. However, the video signal may be generated from video tape, video camera, or other types of video sources known in the industry.

At least one display monitor will be displaying an output video signal that is being broadcast in a live situation or being recorded. Further, a second display monitor may be a preview monitor that display a possible next video selection. It is desirable to have indicators 51 or labels 51 that correspond to a channel control function.

In certain embodiments of the present invention, there are at least two display monitors integral to the audio console. In further embodiments of the present invention there are at least six display monitors integral to the audio console. In further embodiments there are at least ten display monitors integral to the audio console. As stated above, at least some or all of these monitors may be integral to the mixing bridge 45 portion of the audio console 40.

Figure 4:
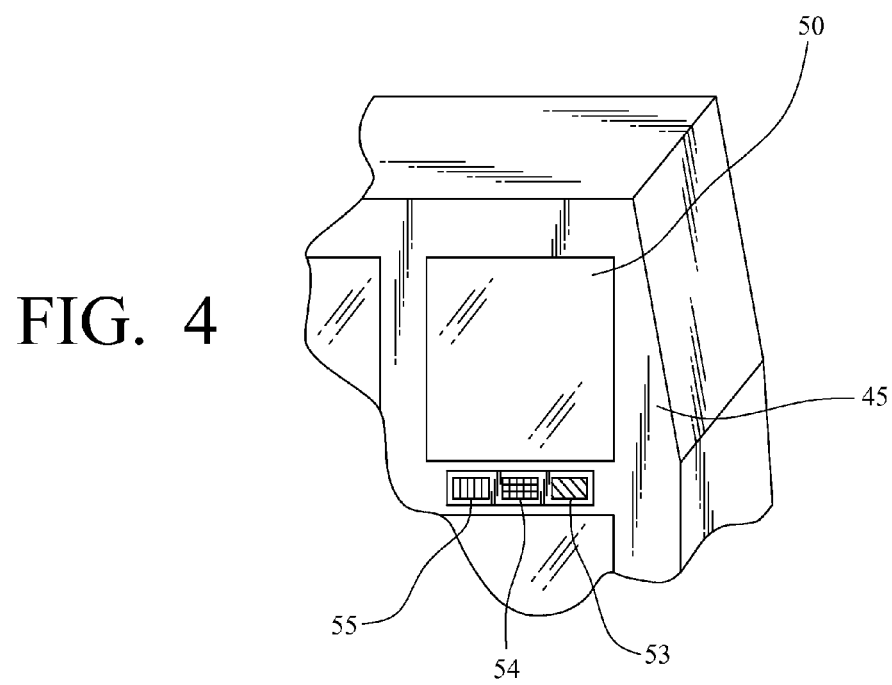
FIG. 4 is a more detailed drawing showing the placement of video monitors and tallies of the mixing console of FIG. 3.

The labels or indicators discussed above may be what is known in the art as tallies. In the embodiments where tallies are used is association with a display monitor to indicate the status of a video signal with respect to the program out, the tallies may be LED indicators. This embodiment is further shown in FIG. 4. In FIG. 4, a display monitor 50 is shown that is integral to the mixing bridge 45. Below the display monitor are three tallies which indicate the status of the video signal and optionally the association of an audio channel to the program out. In FIG. 4, the first tally is a green LED indicator 55 identifying a program preview display. A second tally is a yellow LED indicator 54 identifying a program out display. The third tally is a red LED indicator 55 identifying an audio channel associated with a program out (audio on the air).

As an example of how the tallies may function, an audio operator typically links each display to an associated audio channel. The red tally is on when the audio channel is selected to the main program out. With such indicators it is relatively easy for the operator to see the next video selection when he selects the audio, as both red and yellow tallies would be on. This is a typical manual, audio-follows-video example.

As a further embodiment of the present invention, it is contemplated that the operator may chose to have the audio switching function automatically follow the director's command. In this embodiment, a control switch can automatically select the audio source to correspond to a pre-selected video source, which would compliment a fast moving sports show for example.

As is shown in FIG. 3, and as is typical in the prior art, an audio mixing console for mixing sounds associated with video sources is in a console layout with a series of controls 42, 43 that represent channel modules. The console layout may comprise a main frame for housing audio processing equipment associated with the audio mixing console. In this embodiment, audio processing devices associate an outgoing audio signal with a video signal. Preferably in these embodiments a monitor is housed in the console to display the video signal.

The invention thus being described, it would be obvious that the same may be varied in many ways. Such variations should not be regarded as a departure from the spirit and scope of the present invention, and all such variations as would be obvious to one of ordinary skill in the art are intended to be included within the scope of the following claims.

This application references various patents and/or publications. All such patents and/or publications are expressly incorporated herein by reference in their entirely.

We claim:

1. An audio mixing console, comprising:
   a plurality of connectors for receiving a plurality of video signals for broadcast;
   a plurality of input connectors for receiving a plurality of audio signals for broadcast;
   a control panel that includes a plurality of user operable audio channel controls, wherein each of said user operable audio channel controls is operable to select a predetermined audio processing function for a respective one of said audio signals for broadcast;
   a plurality of discrete display monitors that are integral to the audio mixing console, each monitor for displaying a discrete one of said plurality of video signals for broadcast, a signal processing unit operably connected to said control panel for generating an audio output signal, and
   three tallies associated with each display monitor and integral to the audio mixing console, wherein a first tally functions as an indicator that the associated monitor is currently a program preview display, a second tally functions as an indicator that the associated monitor is currently a program out display, and a third tally functions as an indicator that an audio channel linked to the associated display is the audio output signal.

2. The audio mixing console of claim 1, further comprising a meter bridge that includes an indicator corresponding to a channel control function.

3. The audio mixing console of claim 1, wherein said audio mixing console generates a real-time audio signal that corresponds to a real-time video signal generated from a television camera and displayed on one of said plurality of discrete monitors that are integral to the audio console.

4. The audio mixing console of claim 1, wherein said plurality of discrete display monitors are liquid crystal display (LCD) monitors.

5. The audio mixing console of claim 2, wherein said plurality of discrete display monitors are integral to the meter bridge.

6. The audio mixing console of claim 1, wherein said video signals are generated from video recordings with accompanying audio.

7. The audio mixing console of claim 1, wherein said video signals are generated from video recordings without accompanying audio.

8. The audio mixing console of claim 1, wherein said video signals are live signals generated from video cameras.

9. The audio mixing console of claim 1, wherein said audio output signal corresponds with one of said plurality of video signals.

10. The audio mixing console of claim 1, wherein a display monitor is a program out monitor that displays an output video signal.

11. The audio mixing console of claim 1, wherein a display monitor is a program preview monitor that displays a possible next video selection.

12. The audio mixing console of claim 1, comprising at least 6 display monitors integral to the audio console.

13. The audio mixing console of claim 12, further comprising a meter bridge that includes an indicator corresponding to a channel control function, and wherein each of said at least 6 display monitors are integral to the mixing bridge.

14. The audio mixing console of claim 1, comprising at least 10 display monitors integral to the audio console.

15. The audio mixing console of claim 13, wherein each of said at least 6 display monitors are integral to the mixing bridge.

16. The audio console of claim 1, wherein the first tally is a green LED indicator identifying the program preview display, the second tally is a yellow LED indicator identifying the program out display, and the third tally is a red LED indicator identifying the audio channel linked to the associated display is the audio output signal.

17. The audio console of claim 1, wherein the control panel function comprises a control switch to allow a predetermined audio signal to be selected based on a corresponding video signal.

18. An audio mixing console for mixing sounds associated with video sources, said console comprising:

a console layout with a series of controls for controlling audio channel modules;

a meter bridge that includes an indicator corresponding to a channel control function; and a plurality of discrete display monitors integral to the meter bridge, each monitor for displaying a discrete broadcast video signal; and three tallies per display monitor and integral to the audio mixing console, wherein a first tally is an indicator for identifying that the associated monitor is currently a program preview display, a second tally is an indicator for identifying that the associated monitor is currently a program out display, and a third tally is an indicator for identifying that an audio channel linked to the associated monitor is the audio output signal.

19. The audio mixing console of claim 18, wherein the audio mixing console generates a real-time audio signal that corresponds to a real-time video signal generated from a television camera.

20. The audio mixing console of claim 18, wherein the display monitors are liquid crystal display (LCD) monitors.

21. The audio mixing console of claim 18, comprising at least 6 display monitors integral to the meter bridge for displaying a video signal for broadcast.

* * * * *